United States Patent [19]

Saab

[11] Patent Number: 4,952,315

[45] Date of Patent: Aug. 28, 1990

[54] METHOD, SYSTEM AND EMULSIFIER SUBSTANCE FOR TREATMENT OF MATERIALS CONTAINING HARMFUL SUBSTANCES

[76] Inventor: Nabil Saab, Goldene Linie 22, 2903 Bad Zwischenahn, Fed. Rep. of Germany

[21] Appl. No.: 189,964

[22] Filed: May 4, 1988

[30] Foreign Application Priority Data

May 5, 1987 [DE] Fed. Rep. of Germany ....... 3714918

[51] Int. Cl.$^5$ .................... B01D 17/04; C02F 3/00
[52] U.S. Cl. ................... 210/610; 134/25.1; 210/631; 210/634; 210/639; 210/772; 435/281
[58] Field of Search ............ 210/601, 610, 631, 747, 210/749, 765, 766, 712, 727, 728, 708, 901, 908, 909, 922, 925, 772, 611, 634, 639, 632; 435/262, 264, 281, 282, 253.3; 134/40, 42, 25.1; 208/262.1, 262.5

[56] References Cited

U.S. PATENT DOCUMENTS

| | | | |
|---|---|---|---|
| 4,328,104 | 5/1982 | Hanke et al. | 210/708 |
| 4,374,735 | 2/1983 | Lindorfer et al. | 210/925 |
| 4,392,892 | 7/1983 | Wagner et al. | 134/25.1 |
| 4,395,353 | 7/1983 | Gutnick et al. | 210/925 |
| 4,401,762 | 8/1983 | Tellier et al. | 435/253.3 |
| 4,411,775 | 10/1983 | McCoy et al. | 210/708 |
| 4,416,754 | 11/1983 | Merchant et al. | 210/708 |
| 4,477,286 | 10/1984 | Rossman et al. | 210/708 |
| 4,693,842 | 9/1987 | Shild et al. | 210/925 |
| 4,746,440 | 5/1988 | Jeeger | 210/708 |

FOREIGN PATENT DOCUMENTS

| | | | |
|---|---|---|---|
| 3525712 | 1/1987 | Fed. Rep. of Germany | 210/901 |
| 6136390 | 2/1986 | Japan | 210/749 |

*Primary Examiner*—Peter Hruskoci
*Assistant Examiner*—Joseph Drodge
*Attorney, Agent, or Firm*—Merchant, Gould, Smith, Edell, Welter & Schmidt

[57] ABSTRACT

The invention concerns a method for treatment of solid and fluid materials contaminated by at least predominantly lipophilic harmful substances, in particular hydrocarbons and the like, especially for oil-infested grounds and waters, as well as suitable systems and emulsifier substances for carrying out the method. The contaminated materials, for microdispersed emulsifying of the harmful substances, is intimately mixed with at least one emulsifying substance as well as possibly with water. Subsequently, the emulsion is separated from the material while adding water, and preferentially biologically decomposed.

16 Claims, 1 Drawing Sheet

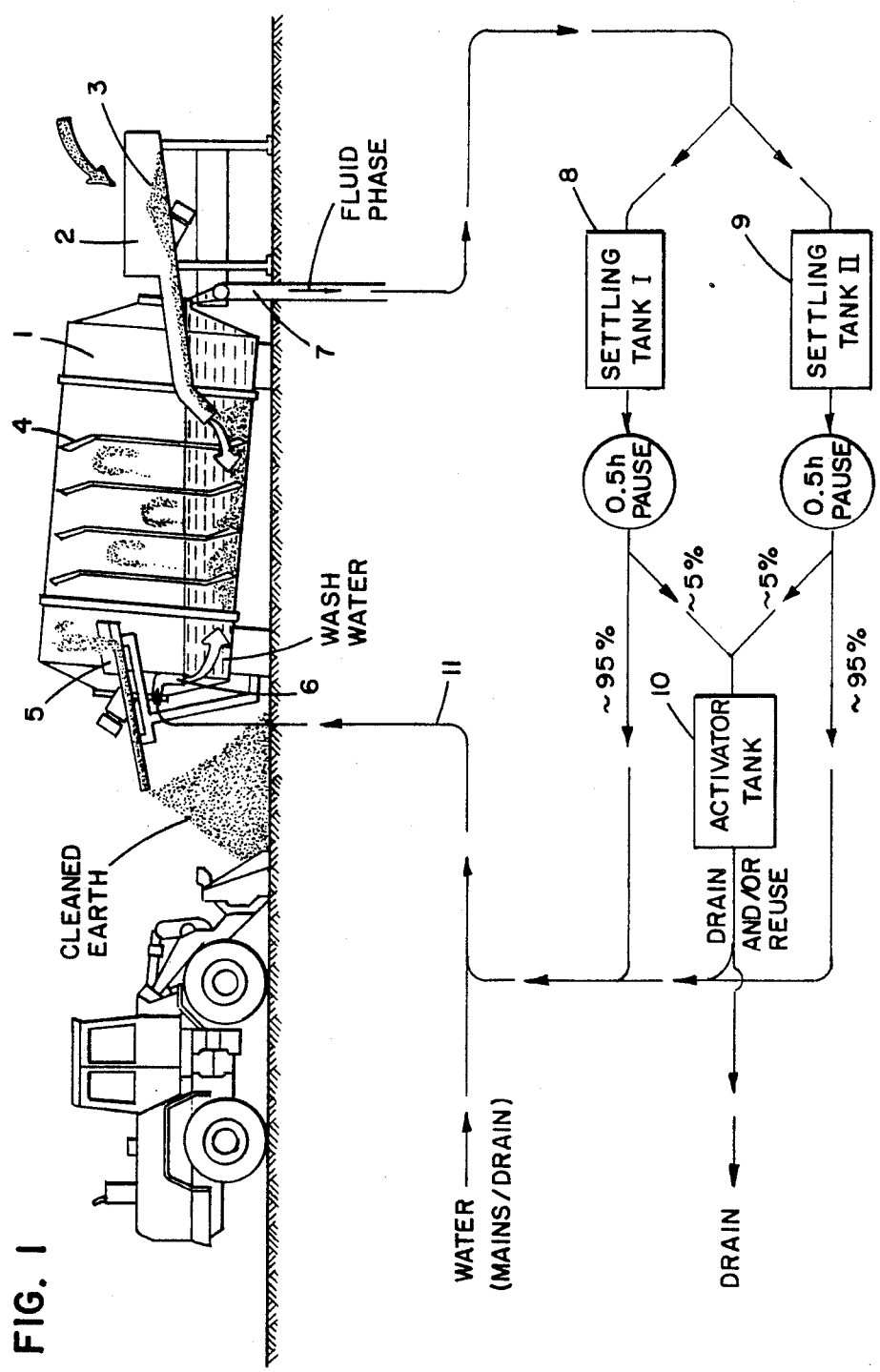

METHOD, SYSTEM AND EMULSIFIER SUBSTANCE FOR TREATMENT OF MATERIALS CONTAINING HARMFUL SUBSTANCES

TECHNICAL FIELD

The invention concerns a method for treatment of solid and fluid materials contaminated by at least predominantly lipophilic harmful substances, in particular hydrocarbons and the like, especially for oil-infested ground and waters, as well as suitable systems and emulsifier substances for carrying out the method.

BACKGROUND OF THE INVENTION

The treatment and or decontamination of materials containing harmful substances is of considerable and ever increasing importance in the most varied of fields. One example for this is offered by the frequently required restoration of soil that is contaminated with oil or similar hydrocarbon compounds, possibly the restoration of disposal grounds that are loaded with tar oil or tar oil-like products, where, in particular, polycyclic, aromatic hydrocarbons occur that are highly hazardous to health. Oil soiling of waters form another example, for instance the frequent restoration of oil-soiled bilge water in ship navigation.

Up until the present time, except for the method of according to the invention, there is no economical, rapid treatment method for these types of materials containing harmful substances. It is for example known how to dredge out oil-infested soil and how to drive out and/or to burn the contaminating organic substances by high heat. However, the expense for this is considerable and the method is extraordinarily involved, since handling at the location of the damage is practically excluded. Added to this is that with this treatment method there constantly exists the danger that hazardous substances will be released.

SUMMARY OF THE INVENTION

The object of the present invention is to obtain a treatment method as well as a system and an emulsifier substance for carrying out this method, that permits an economic, rapid treatment of solid and fluid materials contaminated by at least predominantly lipophilic harmful substances, in particular hydrocarbons and the like, especially oil-infested grounds and waters. In particular, this treatment should follow on a purely biophysical basis, without dangerous substances being released. Strived for in doing this is that the separated out harmful substances, as well as the substances to be used for their separation can be completely taken care of biologically.

For meeting this objective, serving in accordance with the invention are the features of the independent claims.

The associated subclaims describe advantageous embodiments.

The treatment method in accordance with the invention works essentially in washing fashion, in that the harmful substances are brought into a microdispersed, homogeneous emulsion and then separated out. In particular in the case of contaminated solids such as soil etc., for separating out the emulsion an excess of water is added. The emulsified harmful substances float as an organic fluid phase and can, after phase separation (by settling or by means of separator systems), be separated from the wash water. The wash water contains practically no more contaminants and can be to a great extent conveyed in circulatory fashion.

In accordance with the invention, used in particular are emulsifying substances that, because of strong affinity to the oil, render thoroughly soluble, within the shortest time, lying in the range of seconds, oily and/or fatty substances and obtain an enormous increase in surface area. Resulting from this is a stable, homogeneous emulsion with extremely microdispersed harmful particles and/or droplets. By using the nonbacteriacide, completely biologically decomposable emulsifier substances in accordance with the invention, shown surprisingly is that these microdispersed, emulsified particles and/or droplets are strongly accepted by microorganisms. This means that the harmful substances emulsified in accordance with the invention are absorbed very rapidly by the bacteria and, therewith, are rendered harmless, whereby they serve the bacteria as a base for growth.

This effect is in particular obtained when the emulsifying substance for one thing offers hydrophilic and lipophilic functional groups that essentially support the emulsifying action and, for another thing, has one or more types of functional groups that act alternately in acceptance-promoting fashion with bacterial receptor compounds, and in particular with the cell membrane. The bacteria, particularly suited as special harmful substance-adapted bacteria (commercially available), are brought by the latter-mentioned functional groups to recognize in the emulsified harmful substance particles and/or droplets no harmful substances but rather nutrients. In the extreme case, the practically molecular dispersion of the harmful substances produce these in a particle size that the bacteria can absorb without further ado, which decidedly raises acceptance on the part of the micro-organisms.

An example for a particularly suited emulsifying substance in accordance with the invention is the product obtainable under the name PAGO from the firm alfa-zeta pharma GmbH, Bad Zwischenahn.

In particularly preferred fashion, the emulsifying substance contains non-ionogenic and/or anionogenic tensides, for example fatty alcohol polyglycol ether, fatty alcohol polyglycol ether sulfate, respectively their salts, in particular alkali metal salts and/or similar biologically decomposable tensides. Additionally, the emulsifying substance can contain water and inorganic compounds, for example for setting a basic pH value of approximately 10.

The stability of the emulsion obtained depends clearly upon the relative content in emulsifying substance referenced to the content of harmful substance. Preferentially, the emulsifying substance is added in with a relative proportion of 0.1 to 10% by weight, whereby a rapid phase separation with contents below 5% by weight and a persistently stable emulsion with contents of more than 5% by weight is obtained.

It is to be pointed out that many of the commercially available tenside products are less suited for the method in accordance with the invention because these tensides are either not biologically decomposable or even bacteriacidic, generate no sufficiently highly dispersed emulsion or yield emulsions that can no longer be separated; these types of products do not enable as advantageous a treatment as the emulsifying substances utilized in accordance with the invention.

Through the preferentially related circulatory operation of the water utilized for separating out the emulsified harmful substances, its quantity is held to a minimum whereby treatment is simplified and growth activity of the bacteria will be permitted.

In particularly preferred fashion, at the time of separation a floating fluid phase that contains the emulsified harmful substances is separated out in a settling tank and then transferred into an activator tank. In this latter, it is bacteriologically prepared, in particular by means of harmful substance adapted bacteria, whereby following this bacteriological operation at least a portion of innoculated fluid and therewith additionally favoring decomposition of the harmful substance, is fed back into the washing area.

In particularly advantageous fashion, the invention can be used for cleaning oil-contaminated soil whereby, in this case, in a first mixing procedure, formed from the contaminated soil, water and emulsifying substance is a pasty mixture, this pasty mixture is impacted with water and washed, in particular using the counterflow principle, transported by a water bath and the cleaned soil is drawn out at one end of the water bath, while the harmful substance loaded fluid phase is led off at the other end.

The quantity of emulsifying substance to be added to the soil depends upon the extent of the particular contamination, is, however, comparatively little. Typically, these substances are added in a weight ratio of about 5:100. The duration of the first mixing procedure is in a range from 10 to 20 minutes, whereby, after this time, a very homogeneous mixture is present and the extremely finely distributed emulsified oily components are no longer visible in the form of oil eyes.

Washing out the pasty mixture can be carried out in washers of different type constructions. For example, it would be possible to use a vibrating screen sprayed with water, a centrifuge and the like, and it would also be possible to improve the washing procedure by blowing in air and to promote the thereby occasioned vortex motion.

Preferentially, however, used in particular is a transportably structured washing drum whose inner wall is provided with wormlike mixing members so that, with a rotating tank, the pasty material supplied at one end is transported to the oppositely lying outlet end while continuously mixing with the wash water located with it in the tank.

The washing procedure is preferentially carried out using a counterflow principle, with a closed system being provided for the wash water, with only the used water needing to be replaced.

The closed system is obtained by the fact that the wash station is connected in a closed circulatory circuit with settling and activating tanks, with the fluid phase loaded with harmful substances run out from the washing station being conducted via the settling tanks and, at least in an essential portion, is again conducted back into the wash station in extensively cleaned form.

Preferentially, utilized are two alternatingly used settling tanks that, at the time of beginning an operation cycle, are extensively filled with water. The emulsified harmful substances supplied float in the surface region in the settling tanks, so that water can be fed back from the deeper tank region into the wash station, while the harmful substance phase is conveyed on further from the upper region into an activator tank. The containers preferentially constructed as tanks can possibly also be heated in order to improve the living conditions of the natural and/or added bacteria adapted to the harmful substance.

With a system of the described type, it is possible to achieve within a few days an almost complete biological decomposition and, therewith, an extremely environment-friendly treatment of the harmful substances.

BRIEF DESCRIPTION OF THE DRAWING

An example of embodiment of the invention is represented in the drawing. The single figure of the drawing here shows in schematic form an earth preparation system constructed based on the invention.

DETAILED DESCRIPTION OF THE INVENTION

The drawing shows in particular a transportably designed drum washer 1, to one end of which is fed contaminated, already-prepared soil 3, via a discharge chute 2.

The preceding preparation of the solid to be cleaned is done by adding water and emulsifying substance, in particular by adding the already-mentioned product PAGO representing an example for substances of this type. Mixing generates a pasty mixture. The mixing procedure can be carried out in a mobile free-fall mixture based on the type of an appropriate cement mixing vehicle, with the transport path concerned being used simultaneously for carrying out the mixing procedure.

The drum mixer 1 is provided with wormlike structures 4 that guarantee that the contaminated and prepared soil 3 is moved continuously through the drum and, thereby, is intensively washed. The fluid phase containing harmful substance collects in the drum 1 on the surface of the wash water that is fed through he drum in counterflow to the soil and, additionally lying opposite to the feed chute 2, is introduced into the drum 1 by means of at least one line 6. The fluid phase containing harmful substance is drawn out from the drum 1 via a line 7, opposite to the wash water feed.

The cleaned soil comes out of the drum 1 via an outlet chute 5 and can be transported away from there for backfilling.

The fluid phase loaded with harmful substance arrives via line 7 to alternately switched-in settling tanks 8,9. The settling tanks are connected with the wash water supply line 11 over ground-side connected lines that convey lesser loaded water out from the respective settling tanks, i.e. the wash water is supplied in circulatory fashion and only a small portion of the used water—indicated by a corresponding arrow—must be replaced. Connected downstream of the settling tanks 8,9 is an activator tank 10 to which are supplied concentrated harmful substances separated out in the settling tanks which, in turn, quantitywise represent only a small proportion of the total fluid phase supplied in circulatory fashion.

Both through the natural bacteria present in the ground and, in particular, also through means of special cultures adapted to the harmful substance, as for example high-capacity commercially available dry bacteria, achieved in an activator tank 10 is a rapid biological decomposition of the harmful substance, of a higher quality, such that this activator tank can be directly connected to a drainage ditch. The particular efficacy of the bacteria is here a consequence of the described preliminary handling of the harmful substance, in particular the action of the emulsifying substance utilized.

For practical application of the system in accordance with the invention, also of importance is that all components, namely washing stations, settling tanks and activator tanks be constructed to be trans-portable and, therewith, capable of being brought to the particular place of use without problems, with resulting dirty water capable of being simultaneously transported and, therewith, at the time of the next case of application, already innoculated water, i.e. water containing active bacteria cultures, is available.

What is claimed:

1. A method for treatment of a contaminated material constituting a solid or fluid material contaminated by undesirable lipophilic or oily substances or mixtures thereof, which comprises:

mixing the contaminated material with at least one emulsifying composition to produce an admixture of the solid or fluid material and a microdispersion of the undesirable substances with the emulsifying composition, wherein the emulsifying composition is a non-bactericide, is biocompatible, is absorbable by bacteria, and comprises at least one compound having hydrophilic and lipophilic functional groups that act together as an emulsifier, at least one compound which is a non-ionogenic or anionogenic tenside, and at least one compound having one or more functional groups that are recognized by receptors of bacterial cell membranes as absorbable, thereby promoting absorption of the emulsifying composition and undesirable substances through the cell membranes;

mixing water with the admixture;

separating the microdispersion and water from the solid or fluid material; and, treating the microdispersion with bacteria having cell membranes that absorb the undesirable substances and the emulsifying composition.

2. A method according to claim 1 wherein the microdispersion is a stable emulsion, the admixture is an essentially homogeneous distribution, a quantitative excess of water is used in the mixing step, the admixture mixed and washed with the water in a counterflow fashion to produce a floating liquid phase containing the microdispersion to be separated, and the separated water is again used in the mixing step.

3. A method according to claim 1 wherein the emulsifying composition is added in a proportion of 0.1 to 10% by weight relative to the weight of the undesirable substances.

4. A method according to claim 1 wherein the emulsifying composition is added in a proportion of 0.1 to 5% by weight relative to the weight of the undesirable substances.

5. A method according to claim 1 wherein the emulsifying composition is added in a proportion of 1 to 2% by weight relative to the weight of the undesirable substances.

6. A method according to claim 1 wherein the emulsifying composition is added in a proportion of 5 to 10% by weight relative to the weight of the undesirable substances.

7. A method according to claim 1 wherein the emulsifying composition is mixed with the undesirable substances at a neutral pH value.

8. A method according to claim 1 wherein the emulsifying composition is mixed with the undesirable substances at a basic pH value.

9. A method according to claim 1 further comprising resupplying an inoculate of bacteria for subsequent treatment steps.

10. A method according to claim 1 wherein the temperature of the water and admixture is raised by a preset amount during mixing.

11. A method according to claim 1 wherein the admixture is pasty, the mixing with water is accomplished by a counterflow technique, and cleaned soil and the microdispersion are separated in opposite directions relative to each other.

12. A method according to claim 1 wherein the method practiced in a portable system.

13. A method according to claim 1 wherein the emulsifying composition contains water.

14. A method according to claim 1 wherein the mixing is accomplished by a counterflow technique.

15. A method according to claim 1 wherein the undesirable substances are mixtures of hydrocarbons.

16. A method according to claim 1 wherein the separated liquid phase is conducted to a settling tank.

* * * * *

UNITED STATES PATENT AND TRADEMARK OFFICE
CERTIFICATE OF CORRECTION

PATENT NO. : 4,952,315

DATED : August 28, 1990

INVENTOR(S) : Nabil Saab

It is certified that error appears in the above-identified patent and that said Letters Patent is hereby corrected as shown below:

Column 6, line 37, after "method" insert --is--.

Signed and Sealed this

Ninth Day of June, 1992

Attest:

DOUGLAS B. COMER

*Attesting Officer*     Acting Commissioner of Patents and Trademarks